United States Patent [19]

Imamura et al.

[11] Patent Number: 4,734,550
[45] Date of Patent: Mar. 29, 1988

[54] LASER PROCESSING METHOD

[75] Inventors: Seiji Imamura; Noriaki Matsumoto, both of Kanagawa, Japan

[73] Assignee: Fuji Electric Corporate Research & Development Ltd., Kanagawa, Japan

[21] Appl. No.: 897,830

[22] Filed: Aug. 19, 1986

[30] Foreign Application Priority Data

Aug. 20, 1985 [JP] Japan ................. 60-182573

[51] Int. Cl.$^4$ ............................................ B23K 26/00
[52] U.S. Cl. ......................... 219/121 LT; 219/121 LA; 219/121 LP; 219/121 LY
[58] Field of Search ............... 219/121 LH, 121 LJ, 219/121 LY, 121 LA, 121 LP; 350/235

[56] References Cited

U.S. PATENT DOCUMENTS 3,941,973  3/1976  Luck, Jr. et al. ............. 219/121 LH
4,081,654  3/1978  Mracek ..................... 219/121 LP X Primary Examiner—C. L. Albritton
Attorney, Agent, or Firm—Finnegan, Henderson, Farabow, Garrett & Dunner

[57] ABSTRACT

A laser processing method comprises the steps of generating a pulsed laser beam having a substantially circular shape; modifying the beam to a substantially rectangular shape; and scribing the surface of a workpiece with the rectangular beam to form grooves therein. The scribing step may include scanning the surface with the beam in a predetermined pattern, and aligning two parallel sides of the rectangular beam in parallel with the direction of the scanning. The beam may be made square, or may have unequal sides with the longer sides preferably arranged in parallel with the scanning direction.

8 Claims, 17 Drawing Figures

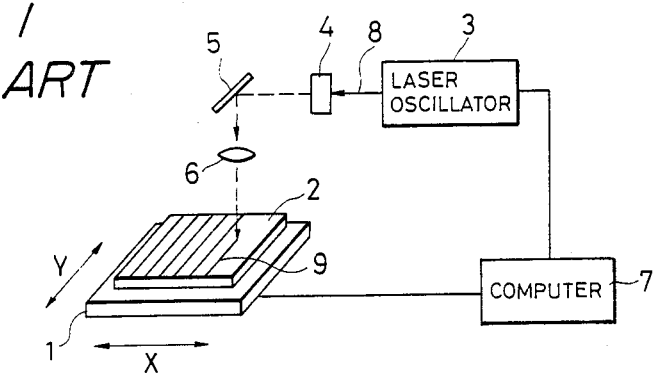
FIG. 1
PRIOR ART
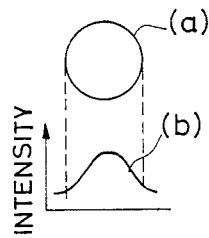
FIG. 2
FIG. 3A
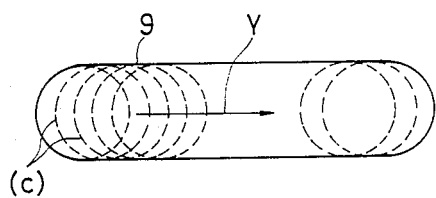
FIG. 3B
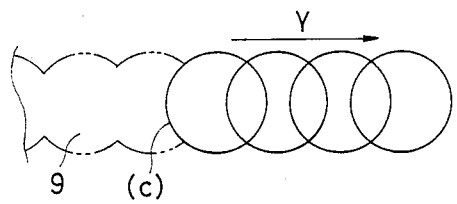
FIG. 4
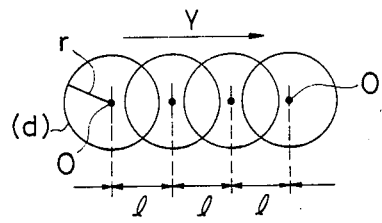
FIG. 5
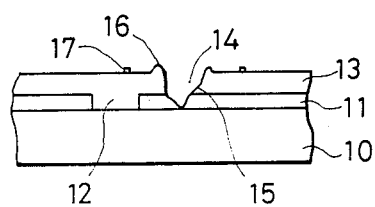

LASER PROCESSING METHOD

BACKGROUND OF THE INVENTION

1. Field of the Invention

The present invention relates to laser processing methods which are used in making thin-film type photoelectric conversion substrates for use in solar batteries or the like. Particularly, the invention relates to a laser-scribe process which utilizes radiation of laser beams onto thin films or surface layers of a substrate to form open grooves through the thin films and thus form patterns.

2. Description of Background Art

A conventionally known laser processing method for patterning the thin films of a photoelectric conversion substrate, comprises the steps of: laser-scribing a first conductive film formed on an insulating substrate to form a first open groove having a predetermined shape and pattern; forming an amorphous semiconductor film on the conductive film; laser-scribing the semiconductor film to form a second open groove at a predetermined position related to the first open groove in a specified pattern; forming a second conductive film on the semiconductor film; and laser-scribing the second conductive groove to form a third open groove at a predetermined position related to the second open groove in a specified pattern.

Referring to FIG. 1, there is shown a block diagram of a conventional laser processing machine used for such laser-scribe processing. In FIG. 1, the reference numeral 1 designates and X-Y table supporting a workpiece 2 to be subjected to laser processing, e.g., a photoelectric conversion substrate as described above. The reference numeral 3 designates a laser oscillator, e.g., for a YAG laser; 4, a collimator lens; 5, a reflecting mirror; 6, a condenser lens; and 7, a computer for drive control. Based on the execution of the program of the computer 7, a laser beam 8 generated by the laser oscillator 3 is radiated onto the surface of the workpiece 2 via the collimator lens 4, the reflecting mirror 5 and the condenser lens 6. According to the numerical control of the computer 7 operated in conjunction with the irradiation of the laser beam, the X-Y table 1 is moved in the direction of the X-axis and Y-axis corresponding to a desired pattern. Accordingly, the focused spot of the laser beam is scanned onto the surface of the workpiece 2 to laser-scribe the surface and thereby form open grooves 9 corresponding to a predetermined circuit pattern. Examples of laser beam scanning methods include a method in which the X-Y table 1 is moved as described above, a method in which the X-Y table 1 is fixed but the irradiation point of the laser beam is moved, and a method in which the laser beam is scanned along a predetermined passage in combination with both of the abovementioned methods.

Generally, the light spot of the laser beam generated by the laser oscillator 3 has been circular. Accordingly, in the conventional laser processing method described above, the laser beam is directly radiated onto the surface of the workpiece 2 via the collimator lens and condenser lens to carry out the laser-scribing process. The focused spot of the laser beam is circular as shown in the reference symbol (a) in FIG. 2, and the distribution of intensity in the radial direction of the focused beam is represented by a Gaussian distribution in which energy density is highest at the center of the focused beam spot and is gradually reduced toward the periphery thereof, as shown in the reference symbol (b) of FIG. 2.

However, problems have been encountefed with the conventional laser processing method described above, where the focused spot of the pulsed laser beam, which is circular in form and has an intensity represented by a Gaussian distribution, is directly radiated onto the surface of a workpiece and is scanned along a predetermined pattern. In order to scan the circular focused spot directly on the surface of the workpiece to form open grooves 9 of uniform width over the entire surface area, repeated irradiation is necessary by scanning in the direction of the arrow Y with finely overlapping repeated pulses of the focused spot (c) along the open groove 9 as shown in FIG. 3A. As a result, the loss in scanning efficiency resulting from the overlapping of the scanned focused spot is significant, and the processing speed for forming the open grooves 9 is correspondingly slower.

This phenomenon will be described in more detail with reference to FIG. 4. In the case where the focused spot (d) is moved along the scanning direction Y with overlapping, the overlapping rate of the focused spot owing to the repeated pulses is represented by overlap percentage $\rho$ expressed by the equation:

$$\rho = (1 - l/2r) \times 100\% \qquad (1)$$

where l is a scanned distance between the center 0 of one focused spot (d) and the center 0 of the next focused spot (d) owing the repeated pulses of the laser beam, and r is a radius of the focused spot (d). Accordingly, in order to overlap the focused spots finely, as shown in FIG. 3A, to form open grooves with a width as uniform as possible, a very large overlap percentage has been required. For example, when the diameter 2r of the focused spot is 50 $\mu$m and the scanned distance between the repeated pulses is 10 $\mu$m, the overlap percentage $\rho$ is 80% as calculated from equation (1). In this case, when the repetition pulse frequency of the pulsed laser beam generated by the laser oscillator is 4 KHz, the moving speed of the irradiation point of the laser beam is 10 $\mu$m $\times$ 4000 Hz=40 mm/sec. In short, the conventional method using such a circularly focused spot requires a very large overlap percentage in order to form open grooves with a uniform width. Thus, the processing speed is limited and, accordingly, it is impossible to raise the speed of the operation to a sufficiently high level. Conversely, when the processing speed is raised, the overlap width of the focused spot in the repeated pulses must be reduced, as shown in FIG. 3B. In that case, the edge of the open groove 9 becomes wavy and, accordingly, it becomes more difficult to form open grooves with a uniform width.

In the photoelectric conversion substrate shown in FIG. 5, a first open groove 12 is formed by laser-scribe processing to receive a first conductive film 11 formed on an insulating substrate 10. Thereafter a second open groove 14 is formed by conventional laser processing in an amorphous semiconductor film 13 formed on the first conductive film 11. The focused spot of the laser beam has an energy density which is higher at its center than at its periphery. Accordingly, the processed bottom surface of the open groove 14 is uneven and, as shown in FIG. 5, the processed depth of the open groove 14 may be excessive at the center thereof. As a result, the open groove 14 may extend into the first conductive film 11, thereby damaging the film 11. At the same time, the processed depth of the open groove 14 often is too shallow at the periphery thereof. As a result, a residue 15 may remain there. Moreover, a projection 16 or a deposit of scattered matter 17 often arises at a top edge of the open groove 14. If these problems, such as unevenness of the processed surface of the open groove 14 or processing damage of the lower film layer, occur in the situation where the open groove is being selectively formed in a thin film of a photoelectric converting element or the like to constitute a thin-film laminate for separating the lamination area, the problems may result in short circuits and an increase in resistance of the lamination area. As a result, photoelectric conversion efficiency is reduced, and this causes excessive scattering in the finished products. Accordingly, the overall yield in a mass production operation becomes very low.

In view of the above-discussed problems, it is an object of the present invention is to provide a laser processing method in which the above-described defects according to the conventional laser processing method can be solved.

It is a further object of the invention to prevent processing damage of the open groove from occurring in a thin-film surface of a photoelectric conversion substrate or the like. Another object of the invention is to form open grooves of a uniform width by laser-scribing at a high speed.

Additional objects and advantages will be obvious from the description, or may be learned by practice of the invention.

SUMMARY OF THE INVENTION

To achieve the foregoing objects and advantages, the laser processing method of the present invention comprises the steps of generating a pulsed laser beam having a substantially circular shape; modifying the beam to a substantially rectangular shape, and scribing the surface of a workpiece with the rectangular beam to form grooves therein.

Preferably, the scribing step includes the steps of scanning the surface with the beam in a predetermined pattern, and aligning two parallel sides of the rectangular beam in parallel with the direction of the scanning.

It is also preferred that the aligning step include the step of arranging the longer two sides of the rectangular beam in parallel with the scanning direction when the rectangular beam has unequal sides. The beam may also be formed with equal sides as a square.

Preferably, the modifying step includes the steps of passing the circular beam through a rectangular aperture of a field stop, and focusing the rectangular beam through a condenser lens. A focal length of about 10 to about 15 mm for the condenser lens is advantageous.

The beam also may be transformed to a substantially uniform density by enlarging the diameter of the beam with a collimator lens, and passing the beam through a field stop having an aperture therein.

BRIEF DESCRIPTION OF THE DRAWINGS

The accompanying drawings, which constitute a part of the specification, illustrate several embodiments of the invention, and, together with the description, serve to explain the principles of the invention. Of the drawings:

FIGS. 1 to 5 show a conventional laser processing method in which:

FIG. 1 is a block diagram of a conventional laser processing machine;

FIG. 2 shows the shape and intensity distribution of a laser beam;

FIGS. 3A and 3B are views showing the conditions in scanning by the spot radiated onto the surface of the workpiece according to the machine of FIG. 1, respectively;

FIG. 4 is a view showing the overlapping condition of the focused spots in the scanning direction owing to the repeated pulses radiated onto the surface of the workpiece;

FIG. 5 is a sectional view of open grooves in the case where laser processing is applied to a photoelectric conversion substrate;

FIGS. 6 to 10 show a first embodiment of the laser processing method according to the present invention, in which;

FIG. 6 is a block diagram of a laser processing machine used for realizing the present invention;

FIG. 9 is a view showing the overlapping condition of the focused spots in the scanning direction according to the present invention;

FIG. 10 is a sectional view of open grooves in the case where the laser processing method according to the present invention is applied to a workpiece to be processed;

DETAILED DESCRIPTION OF THE PREFERRED EMBODIMENT

Reference will now be made in detail to the present preferred embodiment of the invention, examples of which are illustrated in the accompanying drawings.

Figure 6:
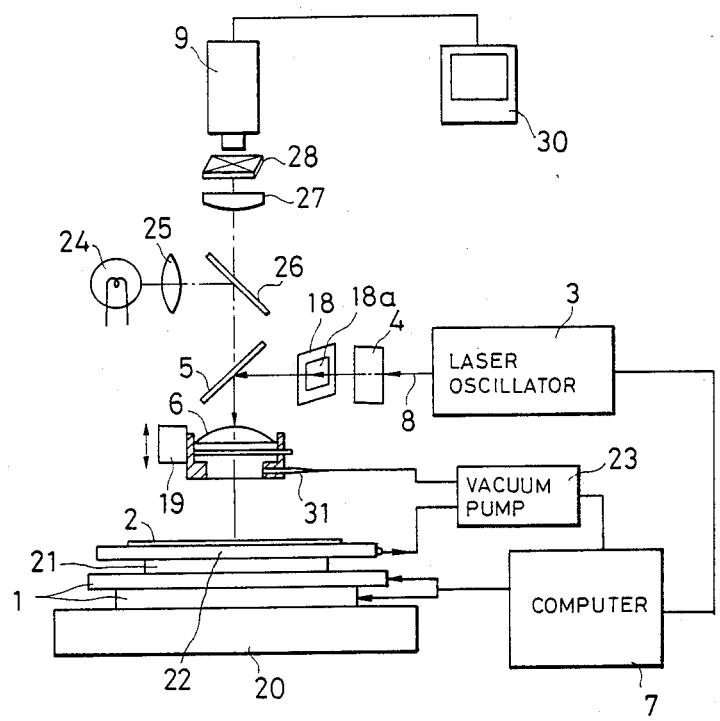

FIG. 6 is a block diagram of an embodiment of the laser processing machine according to the present invention. Like parts in each of FIGS. 1 and 6 are identified by the same reference numerals. In accordance with the invention, the laser processing machine is constituted by a laser optical system, an X-Y table drive system for controlling the movement of a workpiece mounted to be laser-processed, and a monitoring optical system for adjusting the focus of an irradiation spot of the laster beam. As embodied herein, the laser optical system has a laser oscillator 3, a collimator lens 4, a dichromatic mirror 5, a condenser lens 6, and other features of the present invention including a field stop 18, a motor drive mechanism 19 for adjusting the focus of the condenser lens 6, etc. A lens having a very short focal length, e.g., 10 to 15 mm is used as the condenser lens 6. The field stop 18 is interposed between the collimator lens 4 and the mirror 5 in front of the condenser lens 6, and has its center aligned with the optical axis of the laser beams 8. The field stop 18 has a square stop aperture 18a. A YAG laser with a wave length of 1.06 $\mu$WWl m, a repetition pulse frequency of 1 to 40 KHz and an output power of 0.1 to 12 W, is an example of the type device which could be used for the laser oscillator 3.

The X-Y table drive system has a pedestal 20, a movable X-Y table 1 disposed on the pedestal 20 and controlled by a computer 7, a micro-manipulator stage 21 disposed on the X-Y table 1, and a vacuum-suction type holder 22 disposed on the stage 21 for maintaining the workpiece 2 on the upper surface thereof at a predetermined position. The holder 22 has a large number of suction pores on its upper surface communicated with a vacuum pump 23 to maintain the workpiece 2 on the holder at a predetermined position by the action of the vacuum pump 23.

The monitoring optical system includes an illumination lamp 24, an illumination lens 25, a dichromatic mirror 26, an imaging lens 27, a positioning cross-hair 28, a television camera 29, and a monitor television 30. The monitoring optical system is disposed above the condenser lens 6 of the laser optical system with the optical axes aligned therebetween. Close to the condenser lens 6 on the side facing the workpiece 2, a vacuum suction nozzle 31 is connected to a vacuum pump 23. The suction nozzle 31 sucks up extraneous matter vaporized out of the laser-processed surface of the workpiece 2 to remove it from the system.

Next, the procedure and operation of the laser processing machine having the above arrangement will be described. First, in the condition where the workpiece 2 is mounted on the holder 22, the vacuum pump 23 starts to vacuum-suction the workpiece 2 at a predetermined position on the holder 22. Succeedingly, the X-Y table 1 is set to an initial position, and the monitoring optical system starts. The condenser lens 6 is moved up and down by the motor drive mechanism 19 to adjust the focus while the display is observed on the monitor television 30. At the same time, the micro-manipulator stage 21 of the X-Y table drive system is adjusted to make the correct initial setting for the initial position and horizontal degree of the workpiece. Next, the instruction of initiation is given to the computer 7, and the laser oscillator 3 is activated. At the same time, the X-Y table 1 is moved corresponding to a predetermined processing pattern which has been stored in the computer beforehand. Accordingly, the focused spot of the laser beam radiated onto the surface of the workpiece 2 scans along a predetermined pattern to laser-scribe the surface and form open grooves.

Figure 7A:
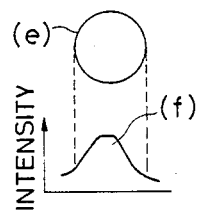
FIGS. 7A and 7B are diagrams showing the form and intensity distribution of laser beams according to the present invention.
Figure 7B:
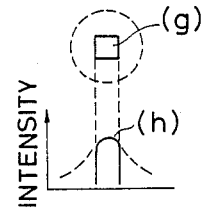

The laser beam 8 has such a shape and intensity distribution as shown in FIG. 7A by the reference symbols (e) and (f) just after it passes through the collimator lens 4. The laser beam 8 has a shape and intensity distribution as shown in FIG. 1B by the reference symbols (g) and (h) just after it passes through the square field stop 18. As is evident, the field stop 18 trims away the edges of the laser beam, which had been circular in cross section, to change the shape of the laser beam to a square section. The field stop 18 also adjusts the intensity distribution from a Gaussian distribution (f) to a flat distribution (h) in which the beam has high energy density and a substantially uniform intensity over the entire area of the beam spot. The shape of the laser beam can be selected to be in the form of square, a rectangle, or the like, as desired, by changing the ratio between the length and width of the stop aperture of the field stop 18.

The field stop 18 is set so that the square focused spot (g) can irradiate on the surface of the workpiece with the two parallel sides of the square spot made parallel to the scanning direction of the laser beam.

Figure 8A:
FIGS. 8A, 8B and 8C are views showing the intensity distribution of a focused spot in the embodiment of FIG. 6.
Figure 8B:
Figure 8C:

The intensity distribution of the laser beam transmitted through the field stop 18 can be selected to any desired distribution, as shown in each of FIGS. 8A to 8C, by changing the magnification of the collimator lens 4 to enlarge the beam diameter. FIGS. 8A, 8B and 8C are arranged in order of rank of the magnification. The laser beam is irradiated on the surface of the workpiece such that two of the parallel sides of the square focused spot (g) are aligned in parallel with the scanning direction of the laser beam on the surface of the workpiece.

Figure 9:
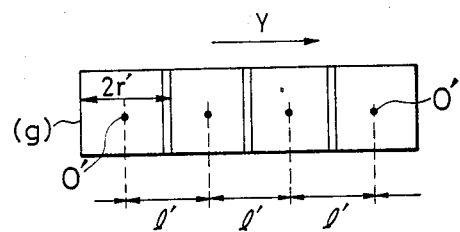

According to the above-mentioned laser processing method, the overlap condition on the surface of the workpiece in scanning of the focused spot resembles that shown in FIG. 9, which corresponds to FIG. 4.

That is, the overlap rate of the focused spot resulting from the repeated pulses is represented by overlap percentage $\rho'$ which is expressed by the equation:

$$\rho' = (1 - l'/2r') \times 100\% \qquad (2)$$

where $l'$ represents a scanned distance between the center $0'$ of one square focused spot (g) and the center $0'$ of the next square focused spot (g) owing the repeated pulses, and $2r'$ represents a length of the two sides of the focused spot along the scanning direction Y. For example, when the size of the square focused spot in FIG. 9 is set to be $50 \times 50$ μm (i.e., $2r' = 50$ μm) and $l'$ is 45 μm, the overlap percentage $\rho'$ is 10%. In this case, when the repeated pulse frequency is selected to be 4 KHz, the moving speed of the irradiation point of the laser beam is 45 μm $\times$ 4000 Hz = 180 mm/sec. In short, the processing speed in this case can be raised by 4.5 times in comparison with the speed of 40 mm/sec in the conventional method described above with reference to FIG. 4. Thus, open grooves having a uniform width can be formed at a much higher speed. It is to be understood that the shape of the field stop 18 may be selected in a rectangle, as described above, and that the two longer sides of the rectangle may be made parallel to the scanning direction of the focused spot to further improve the processing speed. In this case, the processing speed can be raised by about 10 times in comparison with that of the conventional method.

Although FIG. 9 shows the case where the form of the focused spot (g) is a regular square, the form of the focused spot may be made rectangular by making the shape of the stop aperture of the field stop 18 rectangular, as described above. The longer sides of the focused spot may be made parallel to the scanning direction of the spot to further improve the processing speed. For example, when the longer sides of a rectangular focused spot with a size of 75 μm $\times$ 30 μm ($2r' = 70$ μm) are made parallel to the scanning direction and $l'$ is selected to be 70 μm, the overlap percentage $\rho'$ between the repeated pulses is only 7%. In this case, when the repetition pulse frequency is selected to be 4 KHz, the moving speed of the irradiation point of the laser beam is 70 μm $\times$ 4000 Hz = 280 mm/sec. In short, the processing speed in this case can be raised by 7.5 times in comparison with that of the conventional method described above with reference to FIG. 4.

With the machine of FIG. 6, highly precise and uniformly deep open grooves can be formed by laser-scribing without production of unwanted residual materials on the surface of the workpiece. This results from use of a condenser lens 6 having a very short focal length ranging from about 10 mm to about 15 mm, thereby rendering the focal depth very shallow. Also, the flat intensity distribution of the focused spot resulting from the use of the square aperture field stop 18 contributes to the improved operation. Furthermore, it is possible to prevent occurrence of various defects, such as processing damage extending from the bottom of the open grooves into the lower layer, unwanted projections, deposits and the like as described in FIG. 5. It is possible to obtain higher processing performance because the vacuum suction nozzle 31, shown in FIG. 6, in the vicinity of the surface of the workpiece removes scattering material produced during the laser-processing.

As described above, the focused spot of the pulsed laser beam rs formed in the shape of a square and the sides of the focused spot are made parallel to the scanning direction of the laser beam on the surface of the workpiece. As a result, the overlap percentage between the repeated pulses can be greatly reduced in the formation of open grooves of uniform width by laser-scribing. Accordingly, the processing speed can be increased significantly. It is possible to make the depth of the open grooves over the whole area thereof substantially uniform, including portions where the focused spots are overlapped and portions where the focused spots are not overlapped. This is accomplished by selecting the laser beam to have a focused spot a flat intensity distribution over the whole area thereof, as shown in FIG. 8A. In that case, the overlap percentage $\rho'$ is decreased to be nearly 0%. By selecting the laser beam to have a focused spot with an intensity distribution as shown in FIGS. 8B or 8C, the overlap percentage $\rho'$ could be up to 30% or more. The size of the square focused spot irradiated onto the surface of the workpiece can be adjusted by changing the distance between the focal point of the condenser lens and the surface of the workpiece within a range of focal depth without reducing the irradiation energy of the laser beam significantly.

As described above, because the condenser lens 6 has a short focal length of about 10 to 15 mm to thereby make the focal depth very shallow, and because the focused spot has a uniform intensity distribution, highly precise and uniform open grooves can be formed in the thin film by the laser-scribe process. Accordingly, it is possible to prevent the occurrence of various defects, such as processing damage extending from the bottom of the open grooves into the lower layer, unwanted projections, deposits and the like, as described with reference to FIG. 5, and accordingly, it is possible to obtain higher processing performance.

Figure 10:
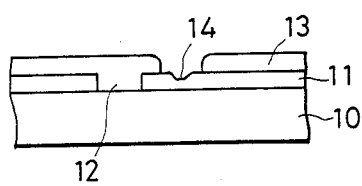

FIG. 10 is a section showing an example where the open groove 14 has been formed in the semiconductor film 13 by laser-scribing the semiconductor film 13 according to the present invention. As is shown, the conductive film 11 and the semiconductor film 13 have been laminated on the insulating substrate 10, similarly to the case of FIG. 5. As will be apparent from the drawing, the residual materials and projecting matter as seen in FIG. 5 are not produced at the open groove 14, and the processed depth of the open groove 14 is substantially uniform in the widthwise direction. Processing damage in the conductive film 11, which is a lower layer, is reduced to a negligible degree, because the focal depth of the condenser lens is very shallow and the intensity distribution of the focused spot is uniform. Thus if the laser beam is focused on the thin film surface to be processed, the lower layer conductive film 11 is out of the focal depth, and the irradiation energy of the laser beam is largely attenuated at the conductive film 11. Because the scattering matter produced during this type of laser-processing is a kind of vaporous matter of fine particles, the deposition of the scattering matter can be easily prevented by positioning the suction nozzle in the vicinity of the laser irradiation point to remove the scattering matter.

Other embodiments for the processing method according to the present invention will be described hereafter.

Figure 13:
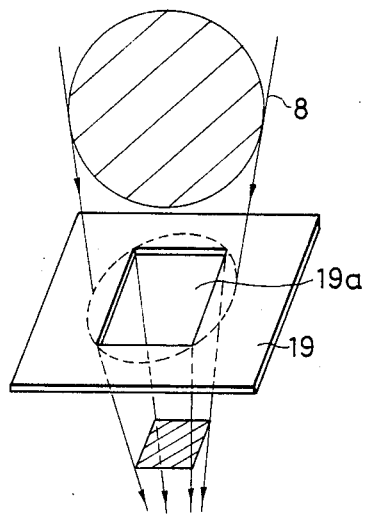
FIG. 13 is a view showing the laser beam in section on opposite sides of the field stop in the above-mentioned embodiments.
Figure 11:
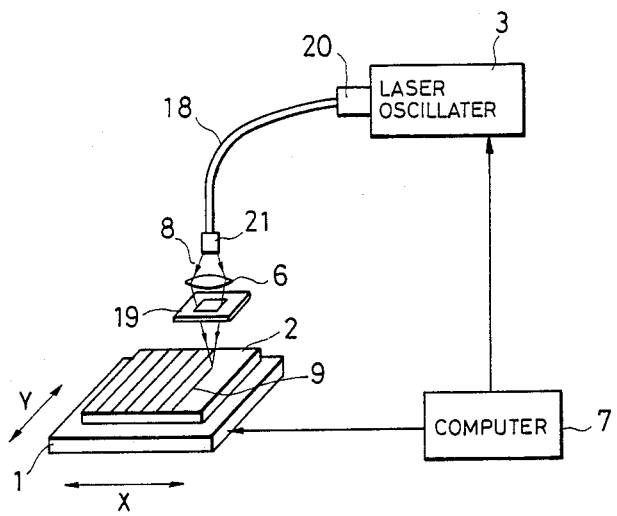
FIGS. 11 and 12 are block diagrams of other embodiments for carrying out the processing method according to the present invention.
Figure 12:
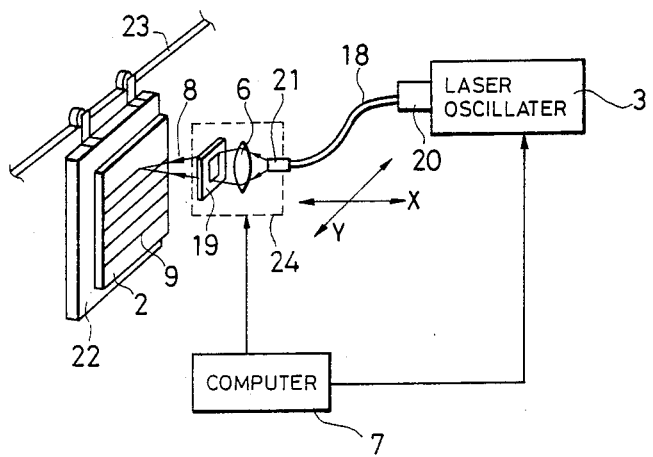

FIGS. 11 and 12 are views of laser processing machines constituting other embodiments according to the present invention. In FIG. 11, the laser processing machine comprises an X-Y table for supporting a workpiece 2, a laser optical system, and an operation control unit 7. The laser optical system has a laser oscillator 3, an optical fiber 18, a collimator lens 4, a condenser lens 6, and a field stop 19. The optical fiber 18 has a laser-input terminal 20 connected to the laser oscillator 6, and a laser-output terminal 21 facing the condenser lens 6 with the optical axes aligned therebetween. The field stop 19 is interposed between the condenser lens 6 and the workpiece 2 with the center thereof aligned with the optical axis of the laser beam 8. The field stop 19 has a square stop aperture 19a opened in parallel to the scanning direction of the laser beam as shown in FIG. 13. For example, a YAG laser with a wavelength of 1.06 $\mu$m, a repetition pulse frequency of 1 to 99 KHz and an output power of 0.1 to 100 W, may be used for the laser oscillator 3. The laser oscillator 3 is not limited to a single-mode type oscillator, but may be a multi-mode type oscillator having output power higher than the single-mode type oscillator.

In such an arrangement as described above, the pulsed laser beam generated by the oscillator 3 is transmitted from the laser-input terminal 20, propagated through the optical fiber 18 to the output terminal 21, and irradiated onto the surface of the workpiece 2 via the condenser lens 6 and the stop aperture 19a of the field stop 19. Movement of the X-Y table 1 supporting the workpiece 2 is controlled in the X-axis and Y-axis directions in accordance with a predetermined processing pattern by the operation control unit 7. The unit 7 is operated in response to the irradiation of the laser beam. Thus, the irradiation spot of the laser beam is scanned on the surface of the workpiece to laser-scribe open grooves 9 in accordance with the predetermined processing pattern. When the focused spot in FIG. 4 is set to satisfy the conditions of the equations 2r=75 $\mu$m and l=15 $\mu$m in order to form open grooves having a uniform width, the overlap percentage is 80% from equation (1). When the repetition pulse frequency is selected to be 4 KHz, the scanning speed of the laser beam is $$15 \ \mu m \times 4000 \ Hz = 60 \ mm/sec. \tag{3}$$

When the size of the square focused spot in FIG. 9 is set to be 75 $\mu$m × 75 $\mu$m (i.e., 2r'=75 $\mu$m) and l' is 70 $\mu$m, the overlap percentage $\rho'$ of the focused spot is about 7% from equation (2). In this case, when the repetition pulse frequency is selected to be 4000 Hz, the scanning speed of the laser beam is $$70 \ \mu m \times 4000 \ Hz = 280 \ mm/sec. \tag{4}$$

Accordingly, the scanning speed, i.e., the laser-scribe processing speed, can be raised by 4.7 times in comparison with that obtained by equation (3) according to the conventional method.

Furthermore, when the size of the rectangular focused spot is 75×200 μm (i.e., 2r'=200 μm) and the pitch l' of the irradiation spot is 180 μm, the overlap percentage p' is 10% in accordance with equation (2). In this case, when the repetition pulse frequency is set to be 10,000 Hz, the scanning speed of the laser beam is $$200 \ \mu m \times 10{,}000 \ Hz = 1800 \ mm/sec. \qquad (5)$$

Accordingly, the scanning speed can be raised by 30 times in comparison with that of equation (3) according to the conventional method. In this case, the form of the stop aperture 19a of the field stop 19 is that of a rectangle in which the ratio of shorter side to the longer side is 75:200. A focused spot having such a wide area is easily produced by the use of a multi-mode laser oscillator, or by positioning the surface of the workpiece slightly out of the focal point of the condenser lens 7 within a range where the irradiation energy density of the laser beam is not reduced significantly.

A further embodiment according to the present invention is shown in FIG. 12. This embodiment differs from the embodiment of FIG. 11 in that a table 22 for holding the workpiece 2 is vertically suspended from a carry rail 23. The laser-output terminal 21 of the optical fiber 18, the condenser lens 6 and the field stop 19 are collectively mounted on an X-Y plotter designated by the reference numeral 24. The X-Y plotter 24 is movement-controlled by the operation control unit 7 so that the table 22 may be stopped at a predetermined position. The irradiation spot of the laser beams is scanned on the surface of the workpiece 2 in accordance with a predetermined processing pattern to thereby perform the laser-scribing.

As described above, according to the present invention, the processing speed in the formation of open grooves having a uniform width can be increased tremendously in comparison with the conventional method using irradiation of a circular focused spot. This is accomplished by making the shape of the focused spot of the laser beam irradiated onto the surface of the workpiece square, and by orienting the two parallel sides of the focused spot parallel to the scanning direction of the laser beam. Furthermore, in laser-scribe processing of a thin film of a workpiece, particularly, a semiconductor device such as a photoelectric conversion substrate, much higher accuracy can be achieved without processing damage in the bottom of the open groove. This is because the intensity distribution of the focused spot is uniform and a short focal length lens is used as the condenser lens. Accordingly, the laser processing method has important practical effects in that the scattering characteristics of finished products is reduced greatly and the overall yield in mass production is extremely improved.

Various modifications and variations could be made in the invention, without departing from the scope or spirit of the invention.

What is claimed is:

1. A laser processing method for scribing the surface of a workpiece, said method comprising:
   generating a laser beam;
   modifying said beam to have a substantially rectangular shape; and
   scribing said surface of said workpiece with said rectangular beam to form a groove in said surface, said scribing step including periodically moving said rectangular beam relative to and along said surface, each movement of said beam causing said beam to irradiate a portion of said surface to form said groove, each of said portions overlapping an adjacent one of said portions by a predetermined amount.

2. The laser processing method of claim 1, wherein said rectangular beam has a first set of parallel sides, and said scribing step includes moving said beam relative to said surface in a predetermined pattern while maintaining said first set of parallel sides substantially in parallel with the direction of said movement.

3. The method of claim 2, wherein said rectangular beam has a second set of parallel sides shorter than said first set of parallel sides, and said scribing step includes maintaining said second set of parallel sides substantially perpendicular to said direction of movement.

4. The method of claim 2, wherein said rectangular beam has sides of equal length.

5. The method of claim 2, wherein said beam modifying step includes,
   passing said beam through a rectangular aperture of a field stop to form said rectangular beam, and
   focusing said rectangular beam with a condenser lens.

6. The method of claim 2, wherein said beam modifying step includes transforming said beam to have a rectangular shape and substantially uniform energy density.

7. The method of claim 6, wherein said transforming step includes,
   enlarging the diameter of said laser beam with a collimator lens to cause said beam to have substantially uniform energy density; and
   passing said enlarged diameter beam through an aperture of a field stop.

8. The method of claim 5, wherein the focal length of said condenser lens is in the range of about 10 to about 15 mm.

* * * * *